(12) United States Patent
Ermecheo

(10) Patent No.: US 11,339,507 B2
(45) Date of Patent: May 24, 2022

(54) YARN MANUFACTURED FROM RECYCLED CLOTHING FIBERS AND PROCESS FOR MAKING SAME

(71) Applicant: Patricia M. Ermecheo, Doral, FL (US)

(72) Inventor: Patricia M. Ermecheo, Doral, FL (US)

(\*) Notice: Subject to any disclaimer, the term of this patent is extended or adjusted under 35 U.S.C. 154(b) by 0 days.

(21) Appl. No.: 16/032,885

(22) Filed: Jul. 11, 2018

(65) Prior Publication Data

US 2019/0316276 A1 Oct. 17, 2019

Related U.S. Application Data

(60) Provisional application No. 62/547,493, filed on Aug. 18, 2017.

(51) Int. Cl.
| | |
|---|---|
| *D02G 3/04* | (2006.01) |
| *D02G 3/44* | (2006.01) |
| *D01G 11/00* | (2006.01) |
| *D04H 1/541* | (2012.01) |
| *D04H 1/4274* | (2012.01) |

(52) U.S. Cl.
CPC ............ *D02G 3/047* (2013.01); *D01G 11/00* (2013.01); *D02G 3/44* (2013.01); *D04H 1/5418* (2020.05); *D04H 1/4274* (2013.01)

(58) Field of Classification Search
CPC ..... Y02W 30/66; D04H 13/00; D04H 1/4274; D04H 1/541; D01G 11/00; D02G 3/44; D02G 3/047; D02G 3/04; D10B 2201/02; D10B 2331/04; D21B 1/04; Y10T 442/608; Y10T 442/2913; B29B 17/04

USPC ........... 19/107, 145.5, 98; 57/252, 400, 256; 428/364, 903.3; 162/4; 28/103, 100; 442/334
See application file for complete search history.

(56) References Cited

U.S. PATENT DOCUMENTS

| | | | |
|---|---|---|---|
| 5,331,801 A * | 7/1994 | Heifetz ................ | D01G 11/00 19/107 |
| 5,919,717 A * | 7/1999 | Wallick ................. | C08J 11/06 442/334 |
| 7,014,804 B2 | 3/2006 | Johansen | |
| 7,097,723 B2 | 8/2006 | Allison et al. | |
| 7,678,719 B2 | 3/2010 | Ogle et al. | |
| 7,682,681 B2 | 3/2010 | Allison et al. | |
| 7,744,143 B2 | 6/2010 | Gladfelter et al. | |
| 7,918,313 B2 | 4/2011 | Gross et al. | |

(Continued)

FOREIGN PATENT DOCUMENTS

RU 2296838 C2 4/2007

*Primary Examiner* — Camie S Thompson
(74) *Attorney, Agent, or Firm* — Hoglund & Pamias, PSC; Roberto J Rios

(57) ABSTRACT

Yarn manufactured from recycled mixed clothing fibers and a process of making yarn manufactured from recycled mixed clothing fibers. Upcycled yarn has approximately 70%-95% of fiber from separated used clothes fibers, whereby separated used clothes fibers have cotton, polyester, nylon, silk, rayon, spandex, synthetic fibers, wool, hemp, carbon fibers, and/or linen. The upcycled yarn also has approximately 5%-30% other fibers that can be recycled fibers and/or virgin fibers, whereby the recycled fiber is recycled polyester from recycled plastic bottles and other sources, recycled cotton, recycled nylon from fishing nets and other sources, and the virgin fiber is nylon, spandex, virgin polyester, hemp, carbon fiber, and/or organic cotton.

14 Claims, 2 Drawing Sheets

(56) References Cited

U.S. PATENT DOCUMENTS

| | | |
|---|---|---|
| 2004/0121691 A1 | 6/2004 | Klein |
| 2009/0173055 A1* | 7/2009 | Silver .................... D02G 3/04 |
| | | 57/256 |
| 2010/0279085 A1 | 11/2010 | Adam et al. |
| 2010/0279567 A1 | 11/2010 | Andersen |
| 2011/0057346 A1 | 3/2011 | Nunn |
| 2011/0073239 A1 | 3/2011 | Manning et al. |
| 2011/0094691 A1* | 4/2011 | Nunn ...................... D21B 1/04 |
| | | 162/4 |
| 2011/0173924 A1 | 7/2011 | Ambrose, Jr. et al. |
| 2013/0005209 A1 | 1/2013 | Andersen |

* cited by examiner

YARN MANUFACTURED FROM RECYCLED CLOTHING FIBERS AND PROCESS FOR MAKING SAME

OTHER RELATED APPLICATIONS

The present application claims priority of U.S. Provisional Application No. 62/547,493, filed on Aug. 18, 2017, which is hereby incorporated by reference.

BACKGROUND OF THE INVENTION

1. Field of the Invention

The present invention relates to textiles, and more particularly, to yarn manufactured from recycled mixed clothing fibers and a process of making yarn manufactured from recycled mixed clothing fibers.

2. Description of the Related Art

The textile industry is the second most polluting industry on the planet. Each year at a global level, grow cotton for virgin threads uses approximately 40 trillion gallons of water and 12,800,000,000 ounces of pesticides. As an example, making and processing fabrics for a conventional T-shirt requires approximately 700 gallons of water and 2.5 ounces of pesticides. The effect of pesticides is devastating to our earth, wildlife, and farmers alike whereby approximately 12.8 billion pounds of pesticides are used yearly in the United States alone that contaminate grounds, water, rivers, and oceans. Of all the crops in the world, cotton is sprayed with the most chemicals. 60% of the world's cotton is used for clothing and another 35% for home furnishings.

In addition, approximately 11 million tons of clothing is discarded in the United States alone every year. This amount equates to approximately 70 pounds per person in the United States. Not only does this seriously contribute to a growing waste crisis, but it also is a true waste considering that nearly 99% of textiles are recyclable. The United States generates a staggering 25 billion pounds of post consumer textile waste per year and that figure is projected to increase yearly by 2%. That being said, only about 15% of clothing is donated or recycled.

Applicant believes that one of the closest references corresponds to U.S. Patent Application Publication No. 2013/0005209, published on Jan. 3, 2013 to Carsten Andersen for Non-woven fibre product comprising fibres of recycled material. However, it differs from the present invention because Andersen teaches an air-laid non-woven fibre product comprising recycled material and manufactured by a dry forming process. The product comprising: a first portion of up to 99% dust material, where the dust material is preferably recovered dust from manufacturing or the like of fibrous textile material, preferably cotton textiles, and a second portion at least 1% bi-component fibres having a length between 2-75 mm, preferably 2-25 mm in length.

Applicant believes that another reference corresponds to U.S. Patent Application Publication No. 2011/0173924, published on Jul. 21, 2011 to Ambrose, et al. for Energy absorptive/moisture resistive underlayment formed using recycled materials and a hard flooring system incorporating the same. However, it differs from the present invention because Ambrose, et al. teach a recycled energy absorptive/moisture resistive underlayment that includes a recycled energy absorbing layer comprised of either a nonwoven fiber batt formed from shoddy fibers or a foam pad formed from bonded foam. To protect the recycled energy absorbing layer from moisture, a moisture barrier is laminated on either one or preferably both side surfaces of the recycled energy absorbing layer. The moisture barrier laminated on a lower side surface of the recycled energy absorbing layer has a projecting flap which projects from first and second edge surfaces of the recycled energy absorbing layer to which the moisture barrier is laminated to the lower side surface thereof. The projecting flap enhances protection of the recycled energy absorbing layer from moisture by preventing moisture from migrating through seams and/or other exposed portions of the recycled energy absorbing layer.

Applicant believes that another reference corresponds to U.S. Patent Application Publication No. 2011/0073239, published on Mar. 31, 2011 to Manning, et al. for Method of making recycled energy absorbing underlayment and moisture barrier for hard flooring system. However, it differs from the present invention because Manning, et al. teach a flooring underlayment comprising a plurality of recycled fibers formed into a nonwoven fiber batt, and a resin intermixed with the recycled fibers in the nonwoven fiber batt, the resin bonding the recycled fibers together. A flooring underlayment comprising a plurality of recycled fibers formed into a nonwoven fiber batt, wherein the nonwoven fiber batt is formed using a method selected from the group comprising resin bonding, thermal bonding, mechanical bonding, and combinations thereof. A nonwoven fiber batt comprising a blend of recycled fibers and binder fibers formed into a nonwoven fiber batt, and a resin intermixed with the recycled fibers and the binder fibers in the nonwoven fiber batt, wherein the resin and the binder fibers bond the recycled fibers and the binder fibers in the nonwoven fiber bait together.

Applicant believes that another reference corresponds to U.S. Patent Application Publication No. 2011/0057346, published on Mar. 10, 2011 to Kayren J. Nunn for Art of using regenerated fibers in multi process non-wovens. However, it differs from the present invention because Nunn teaches fabrics made from bi-component fibers or blends of bi-component and regular fiber are often bonded by through-air bonding systems.

Applicant believes that another reference corresponds to U.S. Patent Application Publication No. 2010/0279567, published on Nov. 4, 2010 to Carsten Andersen for Air-laid non-woven fibre product comprising fibres of recycled material. However, it differs from the present invention because Andersen teaches an air-laid non-woven fibre product manufactured by a dry forming process. The product comprises a first portion of up to 98% recycled shredded material, where the shredded material is a mixture of shredded fabric material fibres from automotive tires or the like and residues of rubber and other components from the shredded tires, and a second portion of 1-30%, preferably 1-5%, bi-component fibres having a length between 2-50 mm, preferably 2-6 mm in length.

Applicant believes that another reference corresponds to U.S. Patent Application Publication No. 2010/0279085, published on Nov. 4, 2010 to Hammam, et al. for Nonwoven composite including post-consumer recycled material. However, it differs from the present invention because Hammam, et al. teach a nonwoven web composite which contains at least 40% by weight of post consumer recycled materials. A nonwoven web composite with its fairly high post consumer recycled material content, has physical properties similar to those of a nonwoven web composite prepared from virgin materials.

Applicant believes that another reference corresponds to U.S. Patent Application Publication No. 2004/0121691, published on Jun. 24, 2004 to Douglas J. Klein for Multifunctional insulation article. However, it differs from the present invention because Klein teaches a multifunctional insulation article for application to a substrate comprising a first layer of shoddy, a second layer of absorptive material attached to the first layer; and a third layer of covering material attached to the second layer. The first layer includes at lest 50.0 wt. % of recycled post industrial cotton fabric which is shredded and generally combined with a limited amount of other fibrous components such as synthetic and actual fiber based products.

Applicant believes that another reference corresponds to U.S. Pat. No. 7,918,313 issued to Gross, et al. on Apr. 5, 2011 for Nonwoven material for acoustic insulation, and process for manufacture. However, it differs from the present invention because Gross, et al. teach an acoustically and thermally insulating composite material suitable for use in structures such as buildings, appliances, and the interior passenger compartments and exterior components of automotive vehicles, comprising at least one airlaid fibrous layer of controlled density and composition and incorporating suitable binding agents and additives as needed to meet expectations for noise abatement, fire, and mildew resistance. An air laid structure, which provides a reduced, controlled airflow therethrough useful for acoustic insulation, and includes a woven or nonwoven scrim.

Applicant believes that another reference corresponds to U.S. Pat. No. 7,744,143 issued to Gladfelter, et al. on Jun. 29, 2010 for Nonwoven panel and method of construction thereof. However, it differs from the present invention because Gladfelter, et al. teach a nonwoven material and method of construction thereof from post consumer mixed Asian cardboard for forming structural and/or acoustic and/or thermal panels. The method includes providing post consumer mixed Asian cardboard and comminuting the cardboard into pieces of a predetermined size. Further, combining the reduced sized cardboard pieces with heat bondable textile fibers to form a substantially homogenous mixture, and then, forming a web of the mixture, with the web having a predetermined thickness, in a dry nonwoven webbing process. Then, heating the web to bond the heat bondable material with the reduced size pieces of mixed Asian cardboard to form the nonwoven material.

Applicant believes that another reference corresponds to U.S. Pat. No. 7,682,681 issued to Allison, et al. on Mar. 23, 2010 for Sound absorbing/sound blocking automotive trim products. However, it differs from the present invention because Allison, et al. teach sound absorbing/sound blocking products, including trim products formed from a porous fibrous layer backed by a sound absorbing layer and a sound blocking layer for use within vehicles, and methods of making same. A porous fibrous layer structure including a fibrous layer backing is heated to achieve a fluid or semifluid state and then subjected to vacuum to draw air through the fibrous layer backing to create a porous structure. A layer of sound absorbing and a layer of sound blocking material may be applied to the porous fibrous layer backing to provide improved acoustic properties. An underlayment is included to provide selected areas of increased thickness and provide tailoring of sound attenuation.

Applicant believes that another reference corresponds to U.S. Pat. No. 7,678,719 issued to Ogle, et al. on Mar. 16, 2010 for Method for forming bi-layered fiber and foam carpet underlay. However, it differs from the present invention because Ogle, et al. teach a method for forming a bi-layered carpet underlay. The method includes bonding a layer of non-woven fibers and a layer of re-bonded foam particles together to form the bi-layered carpet underlay. The layers of the carpet underlay can be bonded together with the use of adhesives, by heating a surface of one or both layers to a soft bondable state for lamination between the layers, by applying a film having adhesive surfaces between the layers, or by other suitable bonding means. The bi-layered carpet underlay combines the soft cushioning resilience of foam with the high durability bridging ability of fiber to provide a carpet underlay that maintains its height or thickness and firmness, while imparting softness and cushioning effects over an extended period of wear. Applicant believes that another reference corresponds to U.S. Pat. No. 7,097,723 issued to Allison et al. on Aug. 29, 2006 for Lightweight acoustic automotive carpet. However, it differs from the present invention because Allison, et al. teach a Light weight acoustic carpet including porous carpeting backed by a primary sound reducing layer and localized secondary insulators for use within vehicles, and methods of making same. A porous carpet structure including a carpet backing is heated to achieve a fluid or semi-fluid state and then subjected to intense vacuum to draw air through the carpet backing to create a porous structure. A layer of sound absorbing or insulating material may be applied to the porous carpet structure to provide improved acoustic properties. Secondary sound reducing absorbers/insulators may further be included as part of the molding process to provide selected areas of increased thickness and provide tailoring of sound attenuation.

Applicant believes that another reference corresponds to U.S. Pat. No. 7,014,804 issued to Fridtjov Johansen on Mar. 21, 2006 for Environmentally friendly insulating material and method for manufacture thereof. However, it differs from the present invention because Johansen teaches an environmentally friendly insulating material, or more specifically an insulating mat for insulating buildings, houses etc. and a method for the manufacture thereof. The mat is non-allergenic and almost 100% recyclable, and is characterized in that it consists of fabric remnants, which are shredded into shoddy, mixed with a fibrous polyester with a low melting point and flax fibres to form a homogeneous mass, which is then moulded into the desired shape and then heat-treated until the polyester fibres melt, bonding the fabric and flax fibres together.

Applicant believes that another reference corresponds to RU Patent No. 2,296,838 issued to Frit Jokhansen on Apr. 10, 2007 for Ecologically appropriative isolation material and production method. However, it differs from the present invention because Jokhansen teaches isolation materials, particularly isolation mats for building and building structures and production methods thereof.

Other patents describing the closest subject matter provide for a number of more or less complicated features that fail to solve the problem in an efficient and economical way. None of these patents suggest the novel features of the present invention.

SUMMARY OF THE INVENTION

The present invention is a yarn manufactured from recycled mixed clothing fibers and process for making same, comprising the following steps:

A) collecting used clothes and textile wastes;

B) transporting the used clothes and textile wastes to a factory;

C) introducing the used clothes and textile wastes to a cutter guillotine machine for a cutting process to produce cut used clothes and textile wastes;

D) introducing the cut used clothes and textile wastes to a hopper feeder machine for a hopping process;

E) introducing the cut used clothes and textile wastes to tearing machine for a tearing process;

F) tearing the cut used clothes and textile wastes to produce used clothes fibers while separating the buttons and/or zippers from the used clothes fibers to produce separated used clothes fibers;

G) collecting the separated used clothes fibers;

H) mixing the separated used clothes fibers with other fibers in blending bin machine;

I) spinning the separated used clothes fibers with the other fibers in an spinning machine to produce upcycled yarn;

J) collecting the upcycled yarn; and

K) making new clothing and products from the upcycled yarn.

The steps A)-K) above do not involve water, nor chemicals.

The used clothes and textile wastes are collected in any condition and comprising buttons, zippers, and/or any accessories. The used clothes and textile wastes are introduce on a first conveyor by a robot feeder. The cut used clothes and textile wastes are transported on a second conveyor to the hopper feeder machine.

The tearing machine comprises tearing cylinders to tear the used clothes and textile wastes to produce the used clothes fibers. When the tearing process is occurring a separating process occurs to separate the buttons, zippers, and/or any accessories. The separating process comprises machinery or equipment selected from the group consisting of vacuum systems, magnetism, and/or air pressure.

The separated used clothes fibers are free of plastic and metal matters. The separated used clothes fibers are mixed with the other fibers in a predetermined percentage to obtain the upcycled yarn according to the requirements of the new clothing and products. The upcycled yarn comprises approximately 70%-95% of separated used clothes fibers and approximately 5%-30% of other fibers. The other fibers are selected from recycled fibers and/or virgin fibers. The upcycled yarn comprises separated used clothes fibers and recycled fibers. The upcycled yarn comprises separated used clothes fibers and virgin fibers.

The separated used clothes fibers comprises cotton, polyester, nylon, silk, rayon, spandex, synthetic fibers, wool, hemp, carbon fibers, and/or linen. The recycled fiber comprises recycled polyester from recycled plastic bottles and other sources, recycled cotton, and recycled nylon from fishing nets and other sources. The virgin fiber comprises nylon, spandex, virgin polyester, hemp, carbon fiber, or organic cotton.

The yarn manufactured from recycled mixed clothing fibers and process for making same does not involve water and chemicals. The new clothing and products comprises any textile product. Any textile product comprises clothing, clothing accessories, or any product made of a textile material.

It is one of the main objects of the present invention to provide yarn manufactured from recycled mixed clothing fibers.

It is another object of the present invention to provide a process of making yarn manufactured from recycled mixed clothing fibers.

It is another object of the present invention to provide yarn manufactured from recycled mixed clothing fibers and a process of making same, which ensures a minimal environmental impact from a raw material level.

It is another object of the present invention to provide yarn manufactured from recycled mixed clothing fibers and a process of making same, which produces zero waste.

It is another object of the present invention to provide yarn manufactured from recycled mixed clothing fibers and a process of making same, without utilizing water during the process.

It is another object of the present invention to provide yarn manufactured from recycled mixed clothing fibers and a process of making same, without utilizing chemicals during the process.

It is another object of the present invention to provide yarn manufactured from recycled mixed clothing fibers and a process of making same, without utilizing dyes during the process.

It is another object of the present invention to provide yarn manufactured from recycled mixed clothing fibers and a process of making same, without utilizing pesticides during the process.

It is another object of the present invention to provide yarn manufactured from recycled mixed clothing fibers and a process of making same while keeping textiles as waste from landfills.

It is another object of the present invention to provide yarn manufactured from recycled mixed clothing fibers and a process of making same for manufacturing new apparel.

It is another object of the present invention to provide yarn manufactured from recycled mixed clothing fibers and a process of making same in an effort to close a loop in the textile industry.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
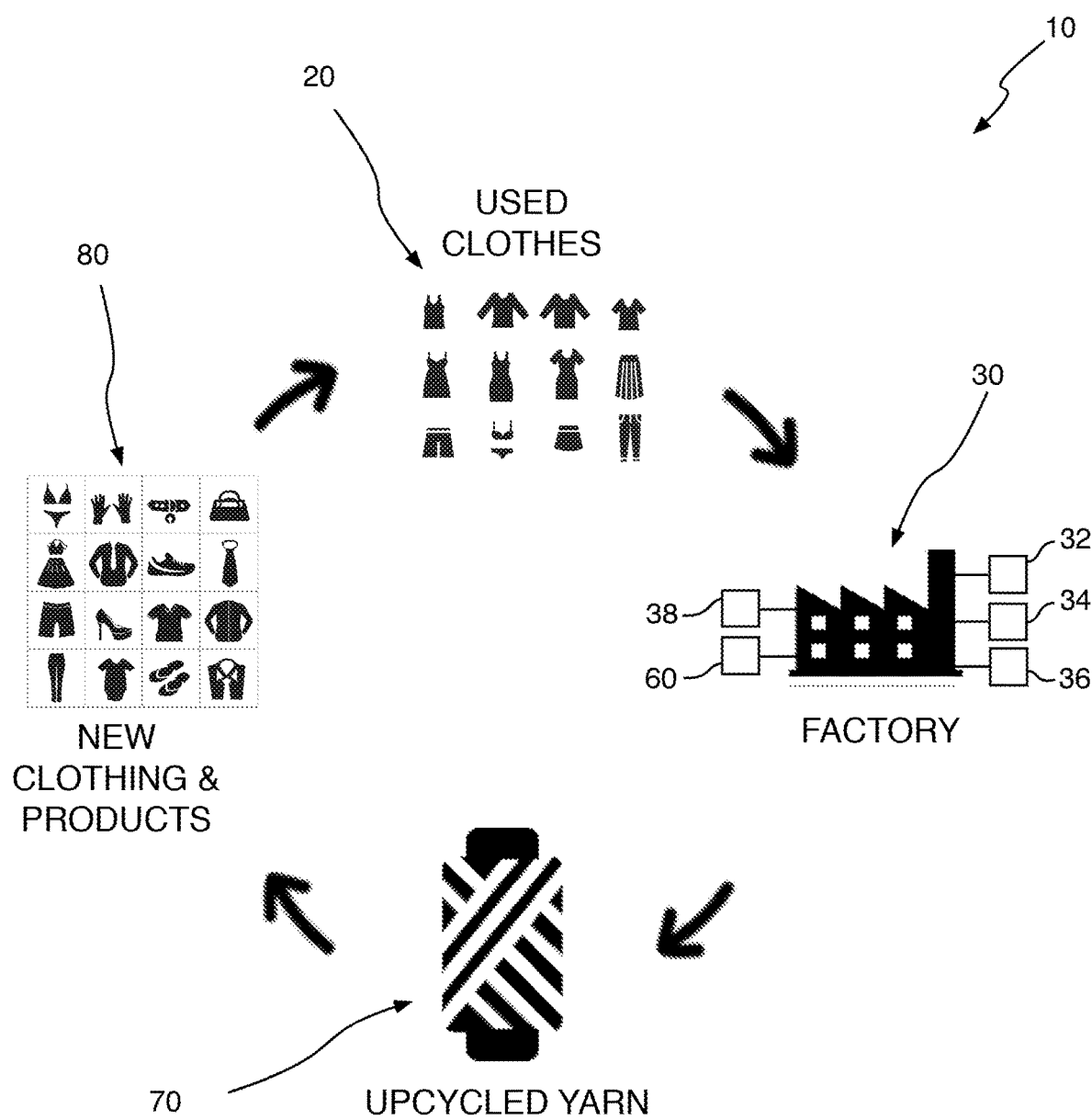
FIG. 1 represents recycling of textiles according to the present invention.

Referring now to the drawings, the present invention is yarn manufactured from recycled mixed clothing fibers and process of making same, and is referred to as yarn manufactured from recycled clothing fibers 70, and process of making same 10.

Figure 2:
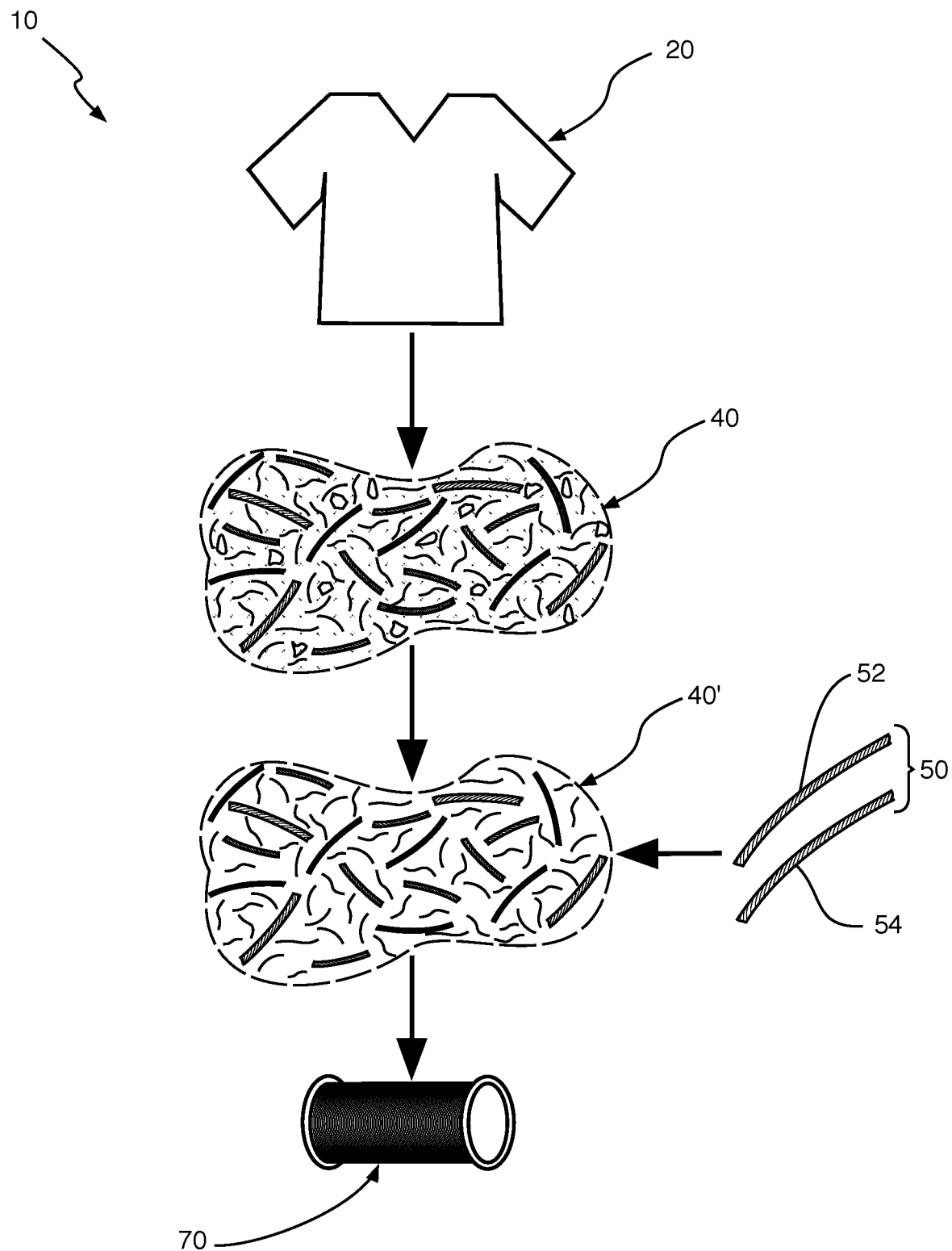
FIG. 2 is a flowchart of the present invention.

As seen in FIGS. 1 and 2, used clothes and textile wastes 20 are collected and processed to manufacture yarn from recycled clothing fibers, also defined as upcycled yarn 70, that is used to manufacture new clothing and products 80.

In a preferred embodiment, process 10 to obtain upcycled yarn 70 comprises the following steps:

A) collecting used clothes and textile wastes 20 that may comprise buttons and/or zippers;

B) transporting used clothes and textile wastes 20 to factory 30;

C) introducing used clothes and textile wastes 20 to cutter guillotine machine 32 for a cutting process to produce cut used clothes and textile wastes 20;

D) introducing cut used clothes and textile wastes 20 to hopper feeder machine 34 for a hopping process;

E) introducing cut used clothes and textile wastes 20 to tearing machine 36 for a tearing process;

F) tearing cut used clothes and textile wastes 20 to produce used clothes fibers 40 while separating the buttons and/or zippers from used clothes fibers 40 to produce separated used clothes fibers 40';

G) collecting separated used clothes fibers 40';

H) mixing separated used clothes fibers 40' with other fibers 50 in blending bin machine 38;

I) spinning separated used clothes fibers 40' with other fibers 50 in spinning machine 60 to produce upcycled yarn 70;

J) collecting upcycled yarn 70; and

K) making new clothing and products 80 from upcycled yarn 70.

For Step A) collecting used clothes and textile wastes 20 that may comprise buttons and/or zippers, used clothes and textile wastes 20 are collected. Used clothes and textile wastes 20 may be in any condition and may have buttons, zippers, and/or any accessories. Making this a zero waste process.

For Step B) transporting used clothes and textile wastes 20 to factory 30, used clothes and textile wastes 20 are transported to factory 30, preferably in bulk.

For Step C) introducing used clothes and textile wastes 20 to cutter guillotine machine 32 for a cutting process to produce cut used clothes and textile wastes 20, a robot feeder introduces used clothes and textile wastes 20 with buttons and/or zippers on a first conveyor. Then, used clothes and textile wastes 20 are transported and introduced to cutter guillotine machine 32 to be cut in the cutting process.

For Step D) introducing cut used clothes and textile wastes 20 to hopper feeder machine 34 for a hopping process, cut used clothes and textile wastes 20 are transported on a second conveyor to hopper feeder machine 34.

For Step E) introducing cut used clothes and textile wastes 20 to tearing machine 36 for a tearing process, top of the line tearing equipment and machine technology specialized in post-consumer (used clothing) and post-industrial (fabric scraps) textile waste is utilized. It is noted that tearing machine 36 operates at sufficiently hot temperatures to kill bacteria of cut used clothes and textile wastes 20.

For Step F) tearing cut used clothes and textile wastes 20 to produce used clothes fibers 40 while separating the buttons and/or zippers from used clothes fibers 40 to produce separated used clothes fibers 40', tearing machine 36 comprises tearing cylinders to tear the used clothes and textile wastes 20 to produce used clothes fibers 40. While the tearing process is occurring a separating process occurs to separate the buttons and/or zippers. The separating process may comprise machinery or equipment including, but not limited to, vacuum systems, magnetism, and/or air pressure.

For Step G) collecting separated used clothes fibers 40', it is noted that used clothes fibers 40' will be free of buttons, zippers, and plastic and metal matter.

For Step H) mixing separated used clothes fibers 40' with other fibers 50 in blending bin machine 38, separated used clothes fibers 40' are mixed with other fibers 50, which can be selected from recycled fibers 52 or virgin fibers 54.

For Step I) spinning separated used clothes fibers 40' with other fibers 50 in spinning machine 60 to produce upcycled yarn 70, spinning machine 60 comprises components to spin separated used clothes fibers 40' with other fibers 50 to produce upcycled yarn 70.

For Step J) collecting upcycled yarn 70, upcycled yarn 70 is collected from spinning machine 60.

For Step K) making new clothing and products 80 from upcycled yarn 70, new clothing and products 80 are manufactured. New clothing and products 80 can be any textile product including clothing, clothing accessories, or any product made of a textile material.

A blend or percentage of used clothes fibers 40' and other fibers 50 may vary depending on the requirements for new clothing and products 80.

In a preferred embodiment, upcycled yarn 70 comprises:

approximately 70%-95% fiber from separated used clothes fibers 40', whereby separated used clothes fibers 40' comprises cotton, polyester, nylon, silk, rayon, spandex, synthetic fibers, wool, hemp, carbon fibers, and/or linen; and approximately 5%-30% other fibers 50 that can be selected from recycled fibers 52 and/or virgin fibers 54, whereby recycled fiber 52 is recycled polyester from recycled plastic bottles and other sources, recycled cotton, recycled nylon from fishing nets and other sources, and virgin fiber 54 comprises nylon, spandex, virgin polyester, hemp, carbon fiber, and/or organic cotton.

A first alternate embodiment, upcycled yarn 70 comprises:

approximately 70%-75% fiber from separated used clothes fibers 40', whereby separated used clothes fibers 40' comprises cotton, polyester, nylon, silk, rayon, spandex, synthetic fibers, wool, hemp, carbon fibers, and/or linen; and approximately 25%-30% recycled polyester from recycled plastic bottles.

A second alternate embodiment, upcycled yarn 70 comprises:

approximately 85%-95% fiber from separated used clothes fibers 40', whereby separated used clothes fibers 40' comprises cotton, polyester, nylon, silk, rayon, spandex, synthetic fibers, wool, hemp, carbon fibers, and/or linen;

approximately 4%-9% nylon; and approximately 1%-6% spandex.

A third alternate embodiment, upcycled yarn 70 comprises:

approximately 70%-80% fiber from separated used clothes fibers 40', whereby separated used clothes fibers 40' comprises cotton, polyester, nylon, silk, rayon, spandex, synthetic fibers, wool, hemp, carbon fibers, and/or linen; and approximately 20%-30% virgin Polyester.

More specifically, in a preferred embodiment, upcycled yarn 70 comprises:

approximately 70% fiber from separated used clothes fibers 40', whereby separated used clothes fibers 40' comprises cotton, polyester, nylon, silk, rayon, spandex, synthetic fibers, wool, hemp, carbon fibers, and/or linen; and approximately 30% recycled polyester from recycled plastic bottles.

The second alternate embodiment, upcycled yarn 70 comprises:

approximately 95% fiber from separated used clothes fibers 40', whereby separated used clothes fibers 40' comprises cotton, polyester, nylon, silk, rayon, spandex, synthetic fibers, wool, hemp, carbon fibers, and/or linen;

approximately 4% nylon; and approximately 1% spandex.

The third alternate embodiment, upcycled yarn 70 comprises:

approximately 70% fiber from separated used clothes fibers 40', whereby separated used clothes fibers 40' comprises cotton, polyester, nylon, silk, rayon, spandex, synthetic fibers, wool, hemp, carbon fibers, and/or linen; and approximately 30% virgin Polyester.

All products made according to the process 10 are high quality. By shredding all kinds of used clothes and textile wastes 20 without any sorting, a unique combination of fibers is obtained, enabling to manufacture premium quality upcycled yarn 70.

Process 10 uses the best technologies available for recycling discarded garments with no harsh chemicals or water involved.

Process 10 for manufacturing upcycled yarn 70 from used clothes and textile waste 20 ensures a minimal environmental impact from a raw material level. The positive environmental impact of process 10 is massive. Process 10 uses no water, chemicals, dyes or pesticides. The manufacture of upcycled yarn 70 avoids pollution, saving millions of gallons of water for new fiber generation and keeping millions of gallons of water clean from toxic dyes and chemical treatments. Process 10 also skips cotton farming and not only saves water, but avoids the use of pesticides that damages the environment and farmers alike. The recycled fabrics from upcycled yarn 70 are not treated with dyes or other toxic treating materials like formaldehyde, heavy metals and salts. In addition, process 10 diverts millions of pounds of textile waste from ending up in landfills.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A method of producing upcycled yarn comprising: cutting used clothes; performing a hopping process on said used clothes that has been cut; tearing said cut used clothes to produce used clothes fibers free from at least one of buttons, zippers, or accessories; mixing said used clothes fibers with additional fibers to produce a mixture of blended fibers free of bacteria, wherein the process does not include utilizing water, chemicals, dyes and pesticides; and spinning said mixture of blended fibers to produce said upcycled yarn.

2. The method of claim 1, wherein said cutting step is performed on a cutter guillotine machine that receives said used clothes from a first conveyor.

3. The method of claim 1, wherein the hopping process is performed on a hopper feeder machine that receives from a second conveyor said used clothes that has been cut.

4. The method of claim 1, wherein the tearing step is performed on a tearing machine that comprises tearing cylinders tearing said used clothes to produce said used clothes fibers.

5. The method of claim 1, wherein the used clothes fibers free from at least one of buttons, zippers, or accessories are obtained by performing a separating process that separates from the used clothes said at least one of buttons, zippers, or accessories during said tearing process.

6. The method of claim 5, wherein the separating process is performed by at least one of vacuum systems, magnetism, or air pressure.

7. The method of claim 1, wherein said used clothes fibers are free of plastic and metal.

8. The method for claim 1, wherein said used clothes fibers comprises at least one of cotton, polyester, nylon, silk, rayon, spandex, synthetic fibers, wool, hemp, carbon fibers, or linen.

9. The method for claim 1, wherein said used clothes fibers are mixed with said additional fibers in a predetermined percentage to obtain said upcycled yarn according to requirements of clothing or products made with said upcycled yarn.

10. The method for claim 1, wherein said upcycled yarn comprises 70%-95% of said used clothes fibers and 5%-30% of said additional fibers.

11. The method for claim 1, wherein said additional fibers comprises at least one of recycled fibers or virgin fibers.

12. The method for claim 11, wherein said recycled fibers comprises at least one of recycled polyester from recycled plastic bottles, recycled cotton, or recycled nylon from fishing nets.

13. The method for claim 11, wherein said virgin fibers comprises at least one of nylon, spandex, virgin polyester, hemp, carbon fiber, or organic cotton.

14. A method of producing upcycled yarn comprising: cutting used clothes and textile wastes; performing a hopping process on said cut used clothes and textile wastes; tearing said cut used clothes and textile wastes to produce used clothes fibers free from at least one of buttons, zippers, or accessories; mixing said used clothes fibers with additional fibers to produce a mixture of blended fibers free of bacteria, wherein the process does not include utilizing water, chemicals, dyes and pesticides; and spinning said mixture of blended fibers to produce said upcycled yarn.

* * * * *